US009844797B2

(12) United States Patent
Skupin et al.

(10) Patent No.: US 9,844,797 B2
(45) Date of Patent: Dec. 19, 2017

(54) COEXTRUSION PAPER COATING METHOD FORMING MULTILAYER COMPRISING BIODEGRADABLE POLYESTER AND POLYLACTIC ACID

(71) Applicant: BASF SE, Ludwigshafen (DE)

(72) Inventors: Gabriel Skupin, Speyer (DE); Robert Loos, Mannheim (DE); Andreas Füßl, Heidelberg (DE); Kimmo Nevalainien, Kotka (FI)

(73) Assignee: BASF SE (DE)

( * ) Notice: Subject to any disclaimer, the term of this patent is extended or adjusted under 35 U.S.C. 154(b) by 0 days.

(21) Appl. No.: 14/864,240

(22) Filed: Sep. 24, 2015

(65) Prior Publication Data

US 2016/0010281 A1 Jan. 14, 2016

Related U.S. Application Data

(63) Continuation of application No. 13/121,560, filed as application No. PCT/EP2009/062262 on Sep. 22, 2009.

(30) Foreign Application Priority Data

Sep. 29, 2008 (EP) .................................... 08165372
Aug. 12, 2009 (EP) .................................... 09010388

(51) Int. Cl.
| | |
|---|---|
| *B05D 1/26* | (2006.01) |
| *B05D 7/00* | (2006.01) |
| *C08L 67/00* | (2006.01) |
| *C08L 67/04* | (2006.01) |
| *C08L 67/02* | (2006.01) |
| *C09D 167/02* | (2006.01) |
| *D21H 19/28* | (2006.01) |
| *D21H 19/20* | (2006.01) |
| *D21H 23/22* | (2006.01) |

(52) U.S. Cl.
CPC .............. *B05D 1/265* (2013.01); *B05D 7/00* (2013.01); *C08L 67/02* (2013.01); *C09D 167/02* (2013.01); *D21H 19/20* (2013.01); *D21H 19/28* (2013.01); *D21H 23/22* (2013.01); *B05D 2203/22* (2013.01); *B05D 2252/00* (2013.01); *B05D 2252/02* (2013.01); *B05D 2252/04* (2013.01); *B05D 2508/00* (2013.01); *C08L 67/04* (2013.01)

(58) Field of Classification Search
CPC ..................................................... D21H 19/28
See application file for complete search history.

(56) References Cited

U.S. PATENT DOCUMENTS

| | | | |
|---|---|---|---|
| 3,651,014 A | 3/1972 | Witsiepe | |
| 3,728,292 A | 4/1973 | McGrath et al. | |
| 4,789,727 A | 12/1988 | Sun | |
| 5,496,887 A | 3/1996 | Braune | |
| 5,817,721 A | 10/1998 | Warzelhan et al. | |
| 5,863,991 A | 1/1999 | Warzelhan et al. | |
| 5,880,220 A | 3/1999 | Warzelhan et al. | |
| 5,883,199 A | 3/1999 | McCarthy et al. | |
| 5,889,135 A | 3/1999 | Warzelhan et al. | |
| 5,936,045 A | 8/1999 | Warzelhan et al. | |
| 6,018,004 A | 1/2000 | Warzelhan et al. | |
| 6,046,248 A | 4/2000 | Warzelhan et al. | |
| 6,103,858 A | 8/2000 | Yamamoto et al. | |
| 6,111,058 A | 8/2000 | Warzelhan et al. | |
| 6,114,042 A | 9/2000 | Warzelhan et al. | |
| 6,120,895 A | 9/2000 | Kowitz et al. | |
| 6,183,814 B1 | 2/2001 | Nangeroni et al. | |
| 6,201,034 B1 | 3/2001 | Warzelhan et al. | |
| 6,258,924 B1 | 7/2001 | Warzelhan et al. | |
| 6,297,077 B1 | 10/2001 | Fischer | |
| 6,303,677 B1 | 10/2001 | Warzelhan et al. | |
| 6,353,084 B1 | 3/2002 | Warzelhan et al. | |
| 6,421,979 B1 | 7/2002 | Fischer et al. | |
| 6,554,182 B1* | 4/2003 | Magnusson ............... | B31B 1/62 229/125.42 |
| 6,645,584 B1* | 11/2003 | Kuusipalo ............... | B32B 27/10 156/244.11 |
| 7,304,172 B2 | 12/2007 | Coates et al. | |
| 8,604,101 B2 | 12/2013 | Ren et al. | |
| 2002/0188071 A1* | 12/2002 | Bastioli ....................... | C08J 5/18 525/165 |
| 2004/0091733 A1 | 5/2004 | Knauf | |
| 2005/0136271 A1* | 6/2005 | Germroth .................. | C08J 5/18 428/480 |
| 2005/0209377 A1 | 9/2005 | Padwa | |

(Continued)

FOREIGN PATENT DOCUMENTS

| | | |
|---|---|---|
| AU | 6755801 A | 1/2002 |
| DE | 4440858 A1 | 5/1996 |

(Continued)

OTHER PUBLICATIONS

"Biodegradeable Ecoflex Grades for Paper Coating", BASF Product Information, dated May 2009.
"Biodegradeable polyester for compostable film", BASF Product Information—Ecoflex F BX 7011, dated Apr. 13, 2006.
Patentee's submission based on European PCT/EP2009/062262, dated Sep. 19, 2011.
"Total petrochemicals Polyethylene LDPE LD 0304", Total Petrochemicals Product Information, dated Jul. 2009.
"Dow Polyethylene 722", DOW techinical informaiton, dated 1995.
"Biodegradeable aliphatic-aromatic polyesters: Ecoflex", obtained from "Biopolymers Online" publication, biographical reference D14a, dated Jan. 15, 2005.

(Continued)

*Primary Examiner* — Francisco Tschen

(74) *Attorney, Agent, or Firm* — Drinker Biddle & Reath LLP

(57) ABSTRACT

The present invention relates to a process for coating paper, wherein the coating material used is a biodegradable, aliphatic-aromatic polyester having a melt volume rate (MVR) according to EN ISO 1133 (190° C., 2.16 kg weight) of from 3 to 50 cm$^3$/10 min.

10 Claims, No Drawings

(56) References Cited

U.S. PATENT DOCUMENTS

| | | | |
|---|---|---|---|
| 2005/0276970 A1 | 12/2005 | Busseuil et al. | |
| 2005/0288452 A1* | 12/2005 | Wakaki | C08L 67/00 525/450 |
| 2006/0051603 A1 | 3/2006 | Cleveland et al. | |
| 2007/0020996 A1 | 1/2007 | Kurzeja | |
| 2007/0178263 A1* | 8/2007 | Guilleux | C09D 201/08 428/35.2 |
| 2007/0231576 A1 | 10/2007 | Davis et al. | |
| 2008/0167419 A1 | 7/2008 | Eipper et al. | |
| 2008/0281018 A1* | 11/2008 | Seeliger | C08L 67/04 523/124 |
| 2009/0234042 A1 | 9/2009 | Luinstra | |
| 2010/0009213 A1 | 1/2010 | Eipper et al. | |
| 2010/0305297 A1* | 12/2010 | Hoshino | B01J 19/18 528/296 |
| 2011/0034662 A1 | 2/2011 | Witt et al. | |
| 2011/0039999 A1 | 2/2011 | Witt et al. | |
| 2011/0098372 A1 | 4/2011 | Aulenta et al. | |
| 2011/0178196 A1 | 7/2011 | Steinke et al. | |
| 2011/0187029 A1 | 8/2011 | Dietrich et al. | |
| 2011/0237743 A1 | 9/2011 | Ren et al. | |
| 2011/0237744 A1 | 9/2011 | Ren et al. | |
| 2011/0318524 A1 | 12/2011 | Jakobi et al. | |
| 2012/0128919 A1 | 5/2012 | Benten et al. | |

FOREIGN PATENT DOCUMENTS

| | | |
|---|---|---|
| DE | 19638686 A1 | 3/1998 |
| DE | 10022552 A1 | 11/2001 |
| DE | 100 53 115 C1 | 4/2002 |
| DE | 102005033912 B3 | 10/2006 |
| DE | 102005053068 A1 | 5/2007 |
| EP | 488617 A2 | 6/1992 |
| EP | 539541 A1 | 5/1993 |
| EP | 0565235 A2 | 10/1993 |
| EP | 575349 A1 | 12/1993 |
| EP | 652910 A1 | 5/1995 |
| EP | 792309 A1 | 9/1997 |
| EP | 1227129 A1 | 7/2002 |
| EP | 1264860 A1 | 12/2002 |
| JP | H08283541 A | 10/1996 |
| JP | 2004300284 A | 10/2004 |
| JP | 2005146482 A | 6/2005 |
| JP | 2007161837 A | 6/2007 |
| KR | 20020051580 A | 6/2002 |
| WO | WO-92/09654 A2 | 6/1992 |
| WO | WO-9214782 A1 | 9/1992 |
| WO | WO-92/19680 A1 | 11/1992 |
| WO | WO-94/03543 A1 | 2/1994 |
| WO | WO-96/15173 A1 | 5/1996 |
| WO | WO-96/15174 A1 | 5/1996 |
| WO | WO-96/15175 A1 | 5/1996 |
| WO | WO-96/15176 A1 | 5/1996 |
| WO | WO-96/21689 A2 | 7/1996 |
| WO | WO-96/21690 A1 | 7/1996 |
| WO | WO-96/21691 A1 | 7/1996 |
| WO | WO-96/21692 A1 | 7/1996 |
| WO | WO-96/25446 A1 | 8/1996 |
| WO | WO-96/25448 A1 | 8/1996 |
| WO | WO-98/12242 A1 | 3/1998 |
| WO | WO-2006/074815 A1 | 7/2006 |
| WO | WO-2006/097353 A1 | 9/2006 |
| WO | WO-2006/097354 A1 | 9/2006 |
| WO | WO-2006/097355 A1 | 9/2006 |
| WO | WO-2006/097356 A1 | 9/2006 |
| WO | WO-2007125039 A1 | 11/2007 |
| WO | WO 2008138892 A1 | 11/2008 |
| WO | WO-2009/024294 A1 | 2/2009 |
| WO | WO-2009/127555 A1 | 10/2009 |
| WO | WO-2009/127556 A1 | 10/2009 |
| WO | WO-2010/034712 A1 | 4/2010 |
| WO | WO-2010034689 A1 | 4/2010 |
| WO | WO 2011054786 A1 | 5/2011 |

OTHER PUBLICATIONS

Dutta, A., "On viscosity—melt flow index relationship," Rheol Acta 23:565-569 (1984).
Griff, A., "Melt Index Mysteries Unmasked," as published in Film Lines (Canadian Plastics Association), Winter 2003, 1 page.
Shenoy et al., "Melt Rheology of Polymer Blends from Melt Flow Index," Intern. J. Polymeric Mater., 1984, vol. 10, pp. 213-235.
Viachopoulos et al., "The Role of Rheology in Polymer Extrusion," 25 pages, date unknown.
Yamamoto, M., Witt, U., Skupin, G., Beimborn, D. Muller, R., J. 2005. Biodegradable Aliphatic-Aromatic Polyesters: "Ecoflex" Biopolymers Online. 4.
"Is sand organic?" Department of Physics, University of Illinois at Urbana-Champaign, Oct. 22, 2007, 1 page, author unknown.

* cited by examiner

COEXTRUSION PAPER COATING METHOD FORMING MULTILAYER COMPRISING BIODEGRADABLE POLYESTER AND POLYLACTIC ACID

CROSS-REFERENCE TO RELATED APPLICATIONS

This application is a continuation application of U.S. patent application 13/121,560 filed Nov. 14, 2011, which is a national stage application (under 35 U.S.C. §371) of PCT/EP2009/062262, filed Sep. 22, 2009, which claims benefit of European applications 08165372.7, filed Sep. 29, 2008 and 09010388.8, filed Aug. 12, 2009 under 35 U.S.C. §119, the disclosures of each application herein are incorporated by reference.

BACKGROUND OF THE INVENTION

The present invention relates to a process for coating paper, wherein the coating material used is a biodegradable, aliphatic-aromatic polyester comprising:
- i) from 40 to 70 mol %, based on the components i to ii, of one or more dicarboxylic acid derivatives or dicarboxylic acids selected from the group consisting of: succinic acid, adipic acid, sebacic acid, azelaic acid and brassylic acid;
- ii) from 60 to 30 mol %, based on the components i to ii, of a terephthalic acid derivative;
- iii) from 98 to 102 mol %, based on the components i to ii, of a $C_2$-$C_8$-alkylenediol or $C_2$-$C_6$-oxyalkylenediol;
- iv) from 0.00 to 2% by weight, based on the total weight of components i to iii, of a chain extender and/or crosslinking agent selected from the group consisting of: a di- or polyfunctional isocyanate, isocyanurate, oxazoline, epoxide, carboxylic anhydride and/or an at least trifunctional alcohol or an at least trifunctional carboxylic acid;
- v) from 0.00 to 50% by weight, based on the total weight of the components i to iv, of an organic filler selected from the group consisting of: native or plasticized starch, natural fibers, wood meal and/or an inorganic filler selected from the group consisting of: chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, glass fibers and mineral fibers and
- vi) from 0.00 to 2% by weight, based on the total weight of the components i to iv, of at least one stabilizer, nucleating agent, lubricant and release agent, surfactant, wax, antistatic agent, antifogging agent, dye, pigment, UV absorber, UV stabilizer or other plastics additive;

and having a melt volume rate (MVR) according to EN ISO 1133 (190° C., 2.16 kg weight) of from 3 to 50 $cm^3$/10 min.

The invention furthermore relates to a process for coating paper, wherein the coating material used is a polymer mixture comprising:
from 5 to 95% by weight of a biodegradable, aliphatic-aromatic polyester obtainable by condensation of:
- i) from 40 to 70 mol %, based on the components i to ii, of one or more dicarboxylic acid derivatives or dicarboxylic acids selected from the group consisting of: succinic acid, adipic acid, sebacic acid, azelaic acid and brassylic acid;
- ii) from 60 to 30 mol %, based on the components i to ii, of a terephthalic acid derivative;
- iv) from 98 to 102 mol %, based on the components i to ii, of a $C_2$-$C_8$-alkylenediol or $C_2$-$C_6$-oxyalkylenediol;
- iv) from 0.00 to 2% by weight, based on the total weight of components i to iii, of a chain extender and/or crosslinking agent selected from the group consisting of: a di- or polyfunctional isocyanate, isocyanurate, oxazoline, epoxide, carboxylic anhydride and/or an at least trifunctional alcohol or an at least trifunctional carboxylic acid;
- v) from 0.00 to 50% by weight, based on the total weight of the components i to iv, of an organic filler selected from the group consisting of: native or plasticized starch, natural fibers, wood meal and/or an inorganic filler selected from the group consisting of: chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, glass fibers and mineral fibers and
- vi) from 0.00 to 2% by weight, based on the total weight of the components i to iv, of at least one stabilizer, nucleating agent, lubricant and release agent, surfactant, wax, antistatic agent, antifogging agent, dye, pigment, UV absorber, UV stabilizer or other plastics additive;

and having a melt volume rate (MVR) according to EN ISO 1133 (190° C., 2.16 kg weight) of from 3 to 50 $cm^3$/10 min;
and
from 95 to 5% by weight of one or more polymers selected from the group consisting of: polylactic acid, polycaprolactone, polyhydroxyalkanoate, chitosan, gluten and one or more aliphatic/aromatic polyesters, such as polybutylene succinate, polybutylene succinate adipate or polybutylene succinate sebacate, polybutylene terephthalate-co-adipate;
and
from 0 to 2% by weight of a compatibilizer, is used.

WO-A 92/09654, WO-A 96/15173, WO-A 2006/097353 to 56 describe, for example, polybutylene terephthalate succinates, adipates, sebacates, azelaates and brassylates and WO 2006/074815 describes mixtures of these aliphatic-aromatic polyesters with other biodegradable polymers, such as polylactic acid or polyhydroxyalkanoates. The possibility of coating paper with these polymers or polymer mixtures is not explicitly mentioned in these documents.

In the attempts to coat paper with the known polyesters and polyester mixtures, only comparatively thick layers could be produced comparatively slowly.

DETAILED DESCRIPTION OF THE INVENTION

The aim of the present invention was accordingly to provide biodegradable polyesters or polyester mixtures which are better suitable for paper coating.

Surprisingly, the processes mentioned at the outset for paper coating have now been found, wherein a polyester having a melt volume rate (MVR) according to EN ISO 1133 (190° C., 2.16 kg weight) of from 3 to 50 cm³/10 min and/or polymer mixtures comprising such polyesters are used.

Polyesters having a melt volume rate (MVR) according to EN ISO 1133 (190° C., 2.16 kg weight) of from 5 to 25 cm³/10 min and particularly preferably from 5 to 12 cm³/10 min are particularly suitable.

If polymer mixtures of the polyesters with other biodegradable polymers, such as, in particular, polylactic acid, are used, it has proven advantageous that these polymers too have good flowability.

For example, polylactic acid having a melt volume rate (MVR) according to EN ISO 1133 (190° C., 2.16 kg weight) of from 4 to 100 cm³/10 min and particularly preferably from 9 to 70 cm³/10 min have proven useful as a component of the mixture.

As mentioned above, polymer mixtures which consist of a flowable polyester and a flowable component of the mixture, such as, in particular, polylactic acid, are particularly suitable for paper coating. The polymer mixture obtained preferably has a melt volume rate (MVR) according to EN ISO 1133 (190° C., 2.16 kg weight) of from 4 to 70 cm³/10 min and particularly preferably from 10 to 30 cm³/10 min. Furthermore, mixtures of flowable polyesters with the abovementioned flowable polymer mixtures are suitable for paper coating.

Partly aromatic polyesters based on aliphatic diols and aliphatic/aromatic dicarboxylic acids are also understood as meaning polyester derivatives, such as polyether esters, polyesteramides or polyether esteramides. The suitable partly aromatic polyesters include linear non-chain-extended polyesters (WO 92/09654). In particular, aliphatic/aromatic polyesters obtained from butanediol, terephthalic acid and aliphatic $C_6$-$C_{18}$-dicarboxylic acids, such as adipic acid, suberic acid, azelaic acid, sebacic acid and brassylic acid (for example as described in WO 2006/097353 to 56) are suitable components for the mixture. Chain-extended and/or branched partly aromatic polyesters are preferred. The latter are disclosed in the documents WO 96/15173 to 15176, 21689 to 21692, 25446, 25448 and WO 98/12242 mentioned at the outset, which are hereby incorporated by reference. Mixtures of different partly aromatic polyesters are also suitable.

As mentioned at the outset, suitable biodegradable, aliphatic-aromatic polyesters for the paper coating process according to the invention are those which comprise:
i) from 40 to 70 mol %, based on the components i to ii, of one or more dicarboxylic acid derivatives or dicarboxylic acids selected from the group consisting of: succinic acid, adipic acid, sebacic acid, azelaic acid and brassylic acid;
ii) from 60 to 30 mol %, based on the components i to ii, of a terephthalic acid derivative;
v) from 98 to 102 mol %, based on the components i to ii, of a $C_2$-$C_8$-alkylenediol or $C_2$-$C_6$-oxyalkylenediol;
iv) from 0.00 to 2% by weight, based on the total weight of components i to iii, of a chain extender and/or crosslinking agent selected from the group consisting of: a di- or polyfunctional isocyanate, isocyanurate, oxazoline, epoxide, carboxylic anhydride and/or an at least trifunctional alcohol or an at least trifunctional carboxylic acid;
v) from 0.00 to 50% by weight, based on the total weight of the components i to iv, of an organic filler selected from the group consisting of: native or plasticized starch, natural fibers, wood meal and/or an inorganic filler selected from the group consisting of: chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, glass fibers and mineral fibers and
vi) from 0.00 to 2% by weight, based on the total weight of the components i to iv, of at least one stabilizer, nucleating agent, lubricant and release agent, surfactant, wax, antistatic agent, antifogging agent, dye, pigment, UV absorber, UV stabilizer or other plastics additive;

and having a melt volume rate (MVR) according to EN ISO 1133 (190° C., 2.16 kg weight) of from 3 to 50 cm³/10 min.

Preferably used aliphatic-aromatic polyesters comprise:
i) from 52 to 65 and in particular from 58 mol %, based on the components i to ii, of one or more dicarboxylic acid derivatives or dicarboxylic acids selected from the group consisting of succinic acid, azelaic acid, brassylic acid and preferably adipic acid, particularly preferably sebacic acid;
ii) from 48 to 35 and in particular 42 mol %, based on the components i to ii, of a terephthalic acid derivative;
iii) from 98 to 102 mol %, based on the components i to ii, of 1,4-butanediol and
iv) from 0 to 2% by weight, preferably from 0.01 to 2% by weight, based on the total weight of the components i to iii, of a chain extender and/or crosslinking agent selected from the group consisting of: a polyfunctional isocyanate, isocyanurate, oxazoline, carboxylic anhydride, such as maleic anhydride, epoxide (in particular an epoxide-containing poly(meth)acrylate) and/or an at least trifunctional alcohol or an at least trifunctional carboxylic acid.

For paper coating, in particular aliphatic-aromatic polyesters having a high proportion of aliphatic dicarboxylic acid of from 52 to 65 and particularly preferably from 52 to 58 mol % are suitable. With a higher proportion of the aliphatic dicarboxylic acid in the aliphatic-aromatic polyesters, it is possible to realize thinner layers. Films of these polyesters show less tendency to melt resonance in coating plants.

Suitable aliphatic dicarboxylic acids are preferably adipic acid and particularly preferably sebacic acid. Sebacic acid-containing polyesters have the advantage that they are also available as renewable raw material and can be drawn out to give thinner films. Films of these polyesters furthermore show less tendency to melt resonance in coating plants.

The synthesis of the polyesters described is effected by the process described in WO-A 92/09654, WO-A 96/15173 or preferably in PCT/EP2009/054114 and PCT/EP2009/054116, preferably in a two-stage reaction cascade. The dicarboxylic acid derivatives are initially reacted together with the diol in the presence of a transesterification catalyst to give a prepolyester. This prepolyester generally has a viscosity number (VN) of from 50 to 100 ml/g, preferably from 60 to 80 ml/g. Catalysts used are usually zinc, aluminum and in particular titanium catalysts. In contrast with the tin, antimony, cobalt and lead catalysts frequently used in the literature, such as, for example, tin dioctanoate, titanium catalysts, such as tetra(isopropyl)orthotitanate and in particular tetrabutyl orthotitanate (TBOT), have the advantage that residual amounts of the catalyst remaining in the product or a secondary product of the catalyst are less toxic. This situation is particularly significant in the case of biodegradable polyesters since they can directly enter the environment via composting.

By means of the two abovementioned processes, it is possible to tailor the desired MVR range simply by the choice of the process parameters, such as residence time, reaction temperature and amount taken off at the top of the tower reactor.

Adaptations of the MVR to higher values can be achieved by addition of components iv) in the stated concentration range or, in the case of the polymer mixtures, by a suitable compatibilizer.

The polyesters according to the invention are then prepared in a second step by the processes described in WO 96/15173 and EP-A 488 617. The prepolyester is reacted with chain extenders vib), for example with diisocyanates or with epoxide-containing polymethacrylates in a chain extension reaction to give a polyester having a VN of from 50 to 450 ml/g, preferably from 80 to 250 ml/g.

As a rule, from 0.01 to 2% by weight, preferably from 0.2 to 1.5% by weight and particularly preferably from 0.35 to 1% by weight, based on the total weight of the components i to iii, of a crosslinking agent (iva) and/or chain extender (ivb) selected from the group consisting of: a polyfunctional isocyanate, isocyanurate, oxazoline, epoxide, carboxylic anhydride, an at least trifunctional alcohol or an at least trifunctional carboxylic acid are used. Suitable chain extenders (ivb) are polyfunctional and in particular difunctional isocyanates, isocyanurates, oxazolines, carboxylic anhydride or epoxides.

Chain extenders and alcohols or carboxylic acid derivatives having at least three functional groups may also be considered as crosslinking agents. Particularly preferred compounds have from three to six functional groups. The following may be mentioned by way of example: tartaric acid, citric acid, malic acid; trimethylolpropane, trimethylolethane, pentaerythritol; polyethertriols and glycerol, trimesic acid, trimellitic acid, trimellitic anhydride, pyromellitic acid and pyromellitic anhydride. Polyols such as trimethylolpropane, pentaerythritol and in particular glycerol are preferred. By means of the components iv, biodegradable polyesters having a structural viscosity can be synthesized. The rheological behavior of the melts improves; the biodegradable polyesters can be more easily processed, for example better drawn out by melt solidification to give films. The compounds iv have a viscosity-reducing effect under shear stress, i.e. the viscosity under load becomes lower.

Examples of chain extenders are described in more detail below.

Epoxides are understood as meaning in particular a copolymer containing epoxide groups and based on styrene, acrylates and/or methacrylates. The units carrying epoxide groups are preferably glycidyl (meth)acrylates. Copolymers having a proportion of glycidyl (meth)acrylate of greater than 20, particularly preferably of greater than 30 and especially preferably of greater than 50% by weight of the copolymer have proven advantageous. The epoxide equivalent weight (EEW) in these polymers is preferably from 150 to 3000 and particularly preferably from 200 to 500 g/equivalent. The average molecular weight (weight average) $M_w$ of the polymers is preferably from 2000 to 25,000, in particular from 3000 to 8000. The average molecular weight (number average) $M_n$ of the polymers is preferably from 400 to 6000, in particular from 1000 to 4000. The polydispersity (Q) is in general from 1.5 to 5. Copolymers of the abovementioned type which contain epoxide groups are sold, for example, by BASF Resins B.V. under the brand Joncryl® ADR. A particularly suitable chain extender is Joncryl® ADR 4368.

As a rule, it is expedient to add the crosslinking (at least trifunctional) compounds at a relatively early time to the polymerization.

Suitable bifunctional chain extenders are the following compounds:

An aromatic diisocyanate ivb is understood as meaning in particular toluene 2,4-diisocyanate, toluene 2,6-diisocyanate, 2,2'-diphenylmethane diisocyanate, 2,4'-diphenylmethane diisocyanate, 4,4'-diphenylmethane diisocyanate, naphthylene 1,5-diisocyanate or xylylene diisocyanate. Among these, 2,2'-, 2,4'- and 4,4'-diphenylmethane diisocyanate are particularly preferred. In general, the latter diisocyanates are used as a mixture. The diisocyanates may also comprise urethione groups in minor amounts, for example up to 5% by weight, based on the total weight, for example for blocking the isocyanate groups.

In the context of the present invention, an aliphatic diisocyanate is understood as meaning in particular linear or branched alkylene diisocyanates or cycloalkylene diisocyanates having 2 to 20 carbon atoms, preferably 3 to 12 carbon atoms, e.g. hexamethylene 1,6-diisocyanate, isophorone diisocyanate or methylenebis(4-isocyanatocyclohexane). Particularly preferred aliphatic diisocyanates are isophorone diisocyanate and in particular hexamethylene 1,6-diisocyanate.

The preferred isocyanurates include the aliphatic isocyanurates which are derived from alkylene diisocyanates or cycloalkylene diisocyanates having 2 to 20 carbon atoms, preferably 3 to 12 carbon atoms, e.g. isophorone diisocyanate or methylenebis(4-isocyanatocyclohexane). The alkylene diisocyanates may be either linear or branched. Isocyanurates which are based on n-hexamethylene diisocyanate, for example cyclic trimers, pentamers or higher oligomers of hexamethylene 1,6-diisocyanate, are particularly preferred.

2,2'-Bisoxazolines are obtainable in general by the process of Angew. Chem. Int. Ed., Vol. 11 (1972), pages 287-288. Particularly preferred bisoxazolines are those in which $R^1$ is a single bond, a $(CH_2)_z$-alkylene group where z=2,3 or 4, such as methylene, ethane-1,2-diyl, propane-1,3-diyl, propane-1,2-diyl, or a phenylene group. 2,2'-Bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, in particular 1,4-bis(2-oxazolinyl)benzene, 1,2-bis(2-oxazolinyl)benzene or 1,3-bis(2-oxazolinyl)benzene, may be mentioned as particularly preferred bisoxazolines.

The polyesters according to the invention have as a rule a number average molecular weight ($M_n$) in the range from 5000 to 100,000, in particular in the range from 10,000 to 75,000, g/mol, preferably in the range from 15,000 to 38,000 g/mol, a weight-average molecular weight ($M_w$) of from 30,000 to 300,000, preferably from 60,000 to 200,000, g/mol and an $M_w/M_n$ ratio of from 1 to 6, preferably from 2 to 4. The viscosity number is from 50 to 450, preferably from 80 to 250, g/ml (measured in o-dichlorobenzene/phenol (weight ratio 50/50). The melting point is in the range from 85 to 150, preferably in the range from 95 to 140° C.

The aliphatic dicarboxylic acid i is used in an amount of from 40 to 70 mol %, preferably from 52 to 65 mol %, and particularly preferably from 52 to 58 mol %, based on the acid components i and ii. Sebacic acid, azelaic acid and brassylic acid are obtainable from renewable raw materials, in particular from castor oil.

The terephthalic acid ii is used in an amount of from 60 to 30 mol %, preferably from 48 to 35 mol % and particularly preferably from 48 to 42 mol %, based on the acid components i and ii.

Terephthalic acid and aliphatic dicarboxylic acid can be used either as free acid or in the form of ester-forming derivatives. The di-$C_1$- to $C_6$-alkyl esters, such as dimethyl, diethyl, di-n-propyl, diisopropyl, di-n-butyl, diisobutyl, di-tert-butyl, di-n-pentyl-, di-isopentyl or di-n-hexyl esters may be mentioned in particular as ester-forming derivatives. Anhydrides of the dicarboxylic acids can also be used.

The dicarboxylic acids or the ester-forming derivatives thereof can be used individually or as a mixture.

1,4-Butanediol is obtainable from renewable raw materials. PCT/EP2008/006714 discloses a biotechnological process for the preparation of 1,4-butanediol starting from different carbohydrates using microorganisms from the class consisting of the Pasteurellaceae.

As a rule, the diol (component iii) is adjusted with respect to the acids (components i and ii) in a ratio of diol to dioic acids of from 1.0 to 2.5:1 and preferably from 1.3 to 2.2:1 at the beginning of the polymerization. Excess amounts of diol are removed during the polymerization so that an approximately equimolar ratio is established at the end of the polymerization. Approximately equimolar is understood as meaning a diol/dioic acid ratio of from 0.98 to 1.02:1.

Said polyesters may have hydroxyl and/or carboxyl terminal groups in any desired ratio. Said partly aromatic polyesters may also be endcapped. Thus, for example, OH terminal groups can be acid-modified by reaction with phthalic acid, phthalic anhydride, trimellitic acid, trimellitic anhydride, pyromellitic acid or pyromellitic anhydride. Polyesters having acid numbers of less than 1.5 mg KOH/g are preferred.

In a preferred embodiment, from 1 to 80% by weight, preferably from 5 to 35% by weight, based on the total weight of the components i to iv, of an organic filler selected from the group consisting of: native or plasticized starch, natural fibers, wood meal and/or an inorganic filler selected from the group consisting of: chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, glass fibers and mineral fibers and are added.

Starch and amylose may be native, i.e. non-thermoplasticized or thermoplasticized with plasticizers, such as, for example, glycerol or sorbitol (EP-A 539 541, EP-A 575 349, EP 652 910).

Natural fibers are understood as meaning, for example cellulose fibers, hemp fibers, sisal, kenaf, jute, flax, abacca, coconut fibers or cordenka fibers.

Glass fibers, carbon fibers, aramid fibers, potassium titanate fibers and natural fibers may be mentioned as preferred fibrous fillers, glass fibers as E-glass being particularly preferred. These can be used as ravings or in particular as cut glass in the commercially available forms. These fibers have in general a diameter of from 3 to 30 μm, preferably from 6 to 20 μm and particularly preferably from 8 to 15 μm. The fiber length in the compound is as a rule from 20 μm to 1000 μm, preferably from 180 to 500 μm and particularly preferably from 200 to 400 μm.

The biodegradable polyester mixtures according to the invention may comprise further ingredients known to the person skilled in the art but not essential to the invention. For example, the additives customary in plastics technology, such as stabilizers; nucleating agents such as polybutylene terephthalate, N,N'-ethylenebisstearylamide, zinc phenylphosphonate, graphite, talc, chalk, precipitated calcium carbonate, kaolin, quartz sand, silicate; lubricants and release agents, such as stearates (in particular calcium stearate); plasticizers, such as, for example, citric esters (in particular acetyl tributyl citrate), glyceric esters, such as triacetylglycerol, or ethylene glycol derivatives, surfactants, such as polysorbates, palmitates or laurates; waxes, such as, for example, beeswax or beeswax esters; antistatic agents, UV absorbers; UV stabilizers; antifogging agents or dyes. The additives are used in concentrations of from 0 to 5% by weight, in particular from 0.1 to 2% by weight, based on the polyesters according to the invention. Plasticizers may be present in an amount of from 0.1 to 10% by weight in the polyesters according to the invention. Particularly preferred is the use of 0.1 to 1% by weight of nucleating agent(s).

The preparation of the biodegradable copolymer mixtures according to the invention from the individual components can be effected by known processes (EP 792 309 and U.S. Pat. No. 5,883,199). For example, all components of the mixture can be mixed in one process step in the mixing apparatuses known to the person skilled in the art, for example kneaders or extruders, at elevated temperatures, for example from 120° C. to 300° C. and reacted.

Typical copolymer mixtures comprise:
from 5 to 95% by weight, preferably from 30 to 90% by weight, particularly preferably from 50 to 70% by weight, of a copolymer according to the invention and
from 95 to 5% by weight, preferably from 70 to 10% by weight, particularly preferably from 50 to 30% by weight, of one or more polymers selected from the group consisting of: polylactic acid, polycaprolactone, polyhydroxyalkanoate, chitosan and gluten and one or more polyesters based on aliphatic dots and aliphatic/aromatic dicarboxylic acids, such as, for example, polybutylene succinate (PBS), polybutylene succinate adipate (PBSA), polybutylene succinate sebacate (PBSSe), polybutylene terephthalate-co-adipate (PBTA) and
from 0 to 2% by weight of a conipatibilizer.

Preferably, the copolymer mixtures in turn comprise from 0.05 to 2% by weight of a compatibilizer. Preferred compatibilizers are carboxylic anhydrides, such as maleic anhydride, and in particular the above-described copolymers containing epoxide groups and based on styrene, acrylates and/or methacrylates. The units carrying epoxide groups are preferably glycidyl (meth)acrylates. Copolymers of the abovementioned type which contain epoxide groups are sold, for example, by BASF Resins B.V. under the brand Joncryl® ADR. For example, Joncryl® ADR 4368 is particularly suitable as a compatibilizer. Suitable polymer mixtures comprise
from 20 to 90% by weight, preferably from 30 to 50% by weight, particularly preferably from 35 to 45% by weight, of a copolymer according to claims 1 to 4 and
from 80 to 10% by weight, preferably from 70 to 50% by weight, particularly preferably from 65 to 55% by weight, of one or more polymers selected from the group consisting of: polyhydroxyalkanoate and in particular polylactic acid and
from 0 to 2% by weight of an epoxide-containing poly (meth)acrylate.

Polymer mixtures may be used as dry mixtures or as compounds.

A suitable biodegradable polyester is, for example, polylactic acid. Polylactic acid having the following property profile is preferably used:
a melt volume rate ((MVR) at 190° C. and 2.16 kg according to ISO 1133) of from 0.5 to 100, preferably from 5 to 70, particularly preferably from 9 to 50, ml/10 minutes;

a melting point below 240° C.;
a glass transition temperature (Tg) of greater than 55° C.;
a water content of less than 1000 ppm;
a residual monomer content (lactide) of less than 0.3%;
a molecular weight of greater than 50,000 daltons.

Preferred polylactic acids are, for example, NatureWorks® 6201 D, 6202 D, 6251 D, 3051 D and in particular 3251 D (polylactic acid from NatureWorks).

Polymer mixtures which comprise an aliphatic-aromatic polyester according to claim 1 and polylactic acid are especially suitable for coating paper. Having proven particularly favourable here are polymer mixtures in which the polylactic acid forms the continuous phase. This is ensured frequently in polymer mixtures which comprise more than 50% by weight of polylactic acid. In comparison to pure PLA, these mixtures are notable for reduced neck-in of the melt web on exit from the flat die—the neck-in is reduced by at least 10%, preferably 20-80%, more preferably by 30-60%. As compared with pure polybutylene adipate terephthalate, PBAT, the melt web is significantly more stable and has better drawing properties to <30 g/m², preferably <20 g/m², more preferably <17 g/m². The effective adhesion to the cellulosic substrate (paper, cardboard) is retained, in dependence on the cooling conditions, by virtue of high web speeds >100 m/min.

Polyhydroxyalkanoates are understood as meaning primarily poly-4-hydroxybutyrates and poly-3-hydroxybutyrates; furthermore, copolyesters of the abovementioned hydroxybutyrates with 3-hydroxyvalerates or 3-hydroxyhexanoate are included. Poly-3-hydroxybutyrate-co-4-hydroxybutyrates are known in particular from Metabolix. They are sold under the trade name Mirel®. Poly-3-hydroxybutyrate-co-3-hydroxyhexanoates are known from P&G or Kaneka. Poly-3-hydroxybutyrates are sold, for example, by PHB Industrial under the brand name Biocycle® and by Tianan under the name Enmat®.

The polyhydroxyalkanoates have, as a rule, a molecular weight $M_w$ of from 100,000 to 1,000,000 and preferably from 300,000 to 600,000.

Polycaprolactone is marketed by Daicel under the product name Placcel®.

The polyesters and polyester mixtures mentioned at the outset have a high biodegradability in combination with good film properties.

In the context of the present invention, the feature "biodegradable" is fulfilled for a substance or a mixture of substances when said substance or the mixture of substances has a percentage degree of biodegradability of at least 90% according to DIN EN 13432.

In general, the biodegradability leads to the polyester (mixtures) decomposing in an appropriate and detectable timespan. The degradation may take place enzymatically, hydrolytically, oxidatively and/or by the action of electromagnetic radiation, for example UV radiation, and is generally predominantly effected by the action of microorganisms, such as bacteria, yeasts, fungi and algae. The biodegradability can be quantified, for example, by mixing polyester with compost and storing it for a certain time. For example, according to DIN EN 13432, $CO_2$-free air is allowed to flow through matured compost during the composting and said compost is subjected to a defined temperature program. Here, the biodegradability is defined via the ratio of the nett $CO_2$ release by the sample (after subtraction of the $CO_2$ release by the compost without sample) to the maximum $CO_2$ release by the sample (calculated from the carbon content of the sample) as percentage degree of biodegradability. Biodegradable polyester (mixtures) show substantial degradation phenomena, such as fungal growth and formation of cracks and holes, as a rule after only a few days of composting.

Other methods for determining the biodegradability are described, for example, in ASTM D 5338 and ASTM D 6400-4.

The polyesters of the process according to the invention moreover have very good adhesive properties. Both extrusion coating and lamination methods are suitable for the production thereof. A combination of these methods is also conceivable.

The process of the invention can be employed, for example, for the coating of paper with monolayers (single-layer coating). The average grammage in this case is generally 10 to 50 and preferably 15 to 30 g/m².

The grammage is determined by means of punched roundels which have in general a diameter of 4.5 inches (114.3 mm). The roundels are weighed both before and after coating. From the difference in weight and from the known area it is possible to report the grammage in g/m².

However, multilayer coatings as well are entirely conventional in paper. As a rule, from 2 to 7 layers and preferably 2 or 3 layers are used in paper coating. Multilayer coating offers the possibility of individually optimizing the welding properties, the barrier properties, and the adhesion of the coating to cardboard for the layers. The average grammage in this case is generally 10 to 60 and preferably 15 to 35 g/m².

Thus, an outer layer or top layer must as a rule be, for example, scratch-resistant and thermally stable and have little tack. The tendency to exhibit tack must be reduced simply to avoid the film sticking to the chill roll in the production process. Preferably, said layer consists of a mixture of from 40 to 60% by weight of an aliphatic-aromatic polyester and from 60 to 40% by weight of polylactic acid and from 0 to 10% by weight of a a wax formulation comprising from 0 to 5% by weight of wax, from 0 to 10% by weight of dispersant (e.g. metal salts of stearic acid, oleic acid, ethylenebisstearylamide, acid amides (e.g. erucamide, oleamide) and from 0 to 5% by weight of antiblocking agent.

The middle layer is as a rule stiffer and may also be referred to as a substrate layer or barrier layer. In paper coating with thin films, the middle layer can also be completely dispensed with. The middle layer preferably comprises from 50 to 100% by weight of polylactic acid and from 0 to 50% by weight of the aliphatic-aromatic polyester.

The inner layer is the layer in contact with the cardboard. It must as a rule be soft and adhere well to the cardboard or the paper. It preferably consists of from 50 to 100% of an aliphatic-aromatic polyester and from 0 to 50% of polylactic acid.

The three-layer coating of paper is preferred. The coating preferably has the following. composition:
  i) an outer layer comprising a mixture of from 40 to 60% by weight of an aliphatic-aromatic polyester and from 60 to 40% by weight of polylactic acid and from 0 to 10% by weight of a wax formulation comprising wax, dispersant and antiblocking agents; in general, the outer layer accounts for 20 to 40% of the layer thickness;
  ii) a middle layer comprising from 50 to 100% by weight of polylactic acid and from 0 to 50% by weight of the aliphatic-aromatic polyester; in general, the middle layer accounts for 20 to 40% of the layer thickness; and
  iii) an inner layer in contact with the cardboard, comprising from 50 to 100% by weight of aliphatic-aromatic polyester and from 0 to 50% by weight of polylactic acid. In general, the inner layer accounts for 20 to 40% of the layer thickness.

The two-layer coating of paper is likewise preferred. The coating preferably has the following composition:

i) an outer layer comprising a mixture from 40 to 60% by weight of an aliphatic-aromatic polyester and from 60 to 40% by weight of polylactic acid and from 0 to 10% by weight of a wax formulation comprising wax, dispersant and antiblocking agents; in general, the outer layer accounts for 20 to 50% of the layer thickness;

iii) an inner layer in contact with cardboard and comprising from 50 to 100% of aliphatic-aromatic polyester and from 0 to 50% of polylactic acid. Here, the inner layer generally takes on the support function and/or barrier function. In general the inner layer accounts for 50 to 80% of the layer thickness.

For the multilayer coating of paper, in general coextrusion methods are used. Coextrusion coating is preferred.

A suitable lamination method for bonding 2 or more films to give a laminate is extrusion lamination, which is likewise suitable as a coating method.

Extrusion coating was developed in order to apply thin polymer layers to flexible substrates, such as paper, cardboard or multilayer films comprising a metal layer at high web speeds of 100-600 m/min. The polyesters according to the invention protect the substrate from oil, fat and moisture and, owing to their weldability with themselves and paper, cardboard and metal, permit the production of, for example, coffee cups, beverage cartons or cartons for frozen food. The polyesters according to the invention can be processed by existing extrusion coating plants for polyethylene (J. Nentwig: Kunststofffolien, Hanser Verlag, Munich 2006, page 195; H. J. Saechtling: Kunststoff Taschenbuch, Hanser Verlag, Munich 2007, page 256; C. Rauwendaal: L Polymer Extrusion, Hanser Verlag, Munich 2004, page 547).

In addition to the increased adhesion to paper and cardboard, the polyesters and polyester mixtures used in the process according to the invention have a lower tendency toward melt resonance in comparison with known solutions in extrusion coating, so that it is possible to employ higher web speeds in the coating pocess and to achieve a significant saving of material.

The process according to the invention is particularly suitable for coating paper for the production of paper bags for dry foods, such as, for example, coffee, tea, soup powders, sauce powders; for liquids, such as, for example, cosmetics, cleaning agents, beverages; of tube laminates; of paper carrier bags; of paper laminates and coextrudates for ice cream, confectionery (e.g. chocolate bars and muesli bars), of paper adhesive tape; of cardboard cups (paper cups), yoghurt pots; of meal trays; of wound cardboard containers (cans, drums), of wet-strength cartons for outer packagings (wine bottles, food); of fruit boxes of coated cardboard; of fast food plates;

of clamp shells; of beverage cartons and cartons for liquids, such as detergents and cleaning agents, frozen food cartons, ice packaging (e.g. ice cups, wrapping material for conical ice cream wafers); of paper labels; of flower pots and plant pots.

Measurements of performance characteristics:

The molecular weight $M_n$ and $M_w$ of the partly aromatic polyesters were determined as follows:

15 mg of the partly aromatic polyesters were dissolved in 10 ml of hexafluoroisopropanol (HFIP). In each case 125 µl of this solution were analyzed by means of gel permeation chromatography (GPC). The measurements were carried out at room temperature. HFIP+0.05% by weight of potassium trifluoroacetate was used for elution. The elution rate was 0.5 ml/min. The following column combination was used (all columns produced by Showa Denko Ltd., Japan): Shodex© HFIP-800P (diameter 8 mm, length 5 cm), Shodex® HFIP-803 (diameter 8 mm, length 30 cm), Shodex® HFIP-803 (diameter 8 mm, length 30 cm). The partly aromatic polyesters were detected by means of an RI detector (differential refractometry). The calibration was effected with polymethyl methacrylate standards having a narrow distribution and molecular weights of $M_n$=505 to $M_n$=2,740,000. Elution ranges lying outside this interval were determined by extrapolation.

The viscosity numbers were determined according to DIN 53728 Part 3, January 3, 1985, capillary viscometry. A Mikro-Ubbelohde, type M-II, was used. The mixture: phenol/dichlorobenzene in the weight ratio 50/50 was used as a solvent.

The melt volume rate (MVR) was determined according to EN ISO 1133. The test conditions were 190° C., 2.16 kg. The melting time was 4 minutes. The MVR gives the rate of extrusion of a molten shaped plastics article through an extrusion die of fixed length and fixed diameter under the prescribed conditions: temperature, load and position of the piston. The volume extruded in a fixed time in the cylinder of an extrusion plastometer is determined.

The layer thickness was determined from punched roundels of 114.3 mm (4.5 inches) in diameter. The roundels were weighed both before and after coating, and the weight difference was determined and was used to calculate the grammage (weight difference/area of roundel). The polymer density in the examples below was 1.25 g/cm$^3$. This allowed the average layer thicknesses to be calculated, in µm.

The degradation rates of the biodegradable polyester mixtures and of the mixtures prepared for comparison were determined as follows:

In each case films having a thickness of 30 µm were produced by pressing at 190° C. from the biodegradable polyester mixtures and the mixtures prepared for comparison. These films were each cut into square pieces having edge lengths of 2×5 cm. The weight of these film pieces was determined in each case and defined as "100% by weight". The film pieces were heated to 58° C. in a plastic can filled with moistened compost in a drying oven over a period of four weeks. At weekly intervals, the remaining weight of the film pieces was measured in each case and converted into % by weight (based on the weight determined at the beginning of the experiment and defined as "100% by weight").

EXPERIMENTAL SETUP

The pilot coating plant (ER-WE-PA) consisted of a main extruder A (Reifenhäuser, 80 mm diameter—30 D) and 3 extruders (B, C, D) with 60 mm diameter/25 D length. With the use of Ecoflex F BX 7011 (a polybutylene terephthalate adipate from BASF SE having an MVR of about 2.5 cm$^3$/10 min, all MVR values used below are determined according to EN ISO 1133 (190° C., 2.16 kg weight)), a throughput of about 90 kg/h at 81 l/min could be achieved. The throughput of the main extruder (Reifenhäuser, 80 mm diameter—30 D) was 190 kg/h at a speed of 77 l/min. The throughput of the extruders was varied in order to achieve layer thicknesses as thin as possible.

The coextrusion plant had a die for die coextrusion which permitted coextrusion of up to 7 layers with a die width of 1000 mm and an adjustable gap width of 0.5 mm. By means of inserts in the melt channel, different layers could be used together. The plant was equipped with a two-layer adapter insert (from Cloeren, with edge encapsulation) of the form AAABBBB with the main extruder as extruder A and a 60 extruder as extruder B. The outer layer A was run with 40% of the total thickness, the inner layer B on the cardboard with 60% of the total thickness.

The cardboard material used was a typical material for coffee cups which has a basis weight (grammage) of about 200 g/m². The cardboard material was activated by a flame ionization unit (gas burner) before coming into contact with the plastic melt.

All coatings were extruded onto the cardboard at a melt temperature of 250° C. and a normal contact pressure on the chill roll of 4 bar. The web speed was varied from 30 m/m in to 200 m/min. Higher speeds led to melt resonance on the pilot plant, depending on the product.

Polyesters Used:
Polyester 1

First, Ecoflex F BX 7011 (a polybutylene terephthalate adipate from BASF SE) having an MVR of 2.5 cm³/10 min was used as reference material.

Polyester 1/Wax Blend

In order to reduce the adhesion on the chill roll, the commercially available Ecoflex batch SL 2 based on Ecoflex F BX 7011, which comprises 5% of a biodegradable wax and 10% of calcium stearate, was used.

Polyester 2

A polybutylene terephthalate sebacate having an MVR of 3.3 cm³/10 min.

Polyester 2/Wax Blend

The blend is a dry mixture and comprises 85% by weight of polyester, 2.5% by weight of a biodegradable wax and 10% of calcium stearate.

Polyester 3

A polybutylene terephthalate adipate having an MVR of 8.0 cm³/10 min.

Polyester 4

A polybutylene terephthalate sebacate having an MVR of 6.4 cm³/10 min.

1. Comparative Example

The main extruder A of the pilot plant was run with polyester 1 for the formation of the base layer on paper and the second extruder B was run with a mixture of 90% of polyester 1 and 10% of polyester 1/wax blend for the formation of the top layer. The melt temperature was 250° C. in both cases.

At a maximum web speed of 80 m/min, a mean layer thickness of 26 μm was achieved. The coating could be detached only with tearing of fibers in the cardboard matrix. At web speeds greater than >80 m/min, the coating could be detached from the cardboard partly without tearing of fibers. The flow instabilities such as increase and decrease of the throughput or a dynamic variation of the melt web width (melt resonance) occurred only from 120 in/min.

Since polyester 1 is based on fossil raw materials, the proportion of renewable raw materials in the comparative example was 0%.

2. Example

Under the same conditions as in comparative example 1, polyester 2 was used instead of polyester 1 (base layer) and polyester 2/wax blend instead of polyester 1/wax blend (top layer).

At a maximum web speed of 80 m/min, a mean layer thickness of 28.6 μm (−10% of the reference layer thickness relative to comparative example 1) was achieved. The coating could be detached only with tearing of fibers in the cardboard matrix. At web speeds greater than >80 m/min, the coating could be detached from the cardboard partly without tearing of fibers. Flow instabilities such as increase and decrease of the throughput or a dynamic variation of the melt web width (melt resonance) occurred only from 150 m/min.

The saving in material by a smaller layer thickness was 10% compared with comparative example 1. The proportion of renewable raw materials was 38%.

3. Example

A compound of 45% of polyester 3 and 55% of polylactic acid (NatureWorks 3251 D) was used in secondary extruder B for the top layer. The main extruder A was operated with polyester 1. The melt temperature was 255° C.

At a maximum web speed of 120 m/min, a mean layer thickness of 19 μm (−41% of the reference layer thickness) was achieved. The coating could be detached only with tearing of fibers in the cardboard matrix. Flow instabilities, such as increase and decrease of the throughput or a dynamic variation of the melt web width (melt resonance), occurred from 140 m/min.

The saving in material compared with the reference is 41%. The proportion of renewable raw materials was 22%.

4. Example

A compound of 24% of polyester 4 16% of polyester 1 and 60% of polylactic acid
(NatureWorks 3251 D) was used in main and secondary extruders A and B. The melt temperature was 258° C.

At a maximum web speed of 170 m/min, a mean layer thickness of 16.5 μm (−48% of the reference layer thickness) was achieved. The coating could be detached only with tearing of fibers in the cardboard matrix. Flow instabilities, such as increase and decrease of the throughput or a dynamic variation of the melt web width (melt resonance), occurred only from 240 m/min. A particularly low neck-in was observed.

The saving in material compared with the reference was 48%. The proportion of renewable raw materials in this coating was 69%.

5. Example—Three-Layer Coating

The Cloeren feed block of the plant was converted so that an AABBBCC structure results. In addition to the main extruder, the secondary extruder C was used, which is comparable with the extruder B. The following mixtures were used:

Extruder B (28.5% of the thickness, top layer): a compound of 24% of polyester 4, 16% of polyester 3 and 60% of polylactic acid (NatureWorks 3251 D)

Extruder A (43% of the thickness, middle layer): a compound of 80% of polylactic acid (NatureWorks 3251 D), 20% of polyester 2

Extruder C (28.5% of the thickness, inner layer): a compound of 24% of polyester 4, 16% of polyester 1 and 60% of polylactic acid (NatureWorks 3251 D)

At a maximum web speed of 150 m/min, a mean layer thickness of 21 μm (−34% of the reference layer thickness) was achieved. The coating can be detached only with tearing of the fibers in the cardboard matrix. Flow instabilities, such as increase and decrease of the throughput and a dynamic variation of the melt web width (melt resonance), occurred only from 190 m/min. A low neck-in was observed.

With this 3-layer coextrusion, a saving of material of 34% was achieved compared with the reference at a web speed of 150 m/min. The proportion of renewable raw materials in this coating was 77%.

With the process according to the invention, melt resonance can be substantially avoided. Furthermore, no flow instabilities (stripes, flow patterns or dynamically varied throughput) occurred. Finally, very good adhesion to paper/cardboard was achieved. This manifested itself in tearing of fibers on detachment from paper/cardboard. It was possible in particular to achieve thin coatings, which led to a considerable saving of material.

We claim:

1. A process comprising:
   applying by coextrusion a coating material to paper to form a coated paper, said coating material comprising;
   20 to 90% by weight of a biodegradable, aliphatic-aromatic polyester, and
   80 to 10% by weight of polylactic acid,
   wherein the biodegradable, aliphatic-aromatic polyester comprises:
   i) from 40 to 70 mol %, based on the total of components i to ii, of a adipic acid derivative or adipic acid;
   ii) from 60 to 30 mol %, based on the total of components i to ii, of a terephthalic acid derivative;
   iii) from 98 to 102 mol %, based on the total of components i to ii, of a $C_2$-$C_8$-alkylenediol or $C_2$-$C_6$-oxyalkylenediol; and
   iv) from 0.01 to 2% by weight, based on the total weight of components i to iii, of a chain extender and/or crosslinking agent selected from the group consisting of: a di-functional isocyanate, polyfunctional isocyanate, isocyanurate, oxazoline, epoxide, carboxylic anhydride, an at least trifunctional alcohol, and an at least trifunctional carboxylic acid;
   the coating material having a melt volume rate (MVR) according to EN ISO 1133 (190° C., 2.16 kg weight) of from 10 to 30 cm$^3$/10 min, and the applying the coating material to paper by coextrusion includes an average grammage of 15 to 35 g/m$^2$ wherein the coating material includes more than 50% by weight of the polylactic acid, which forms a continuous phase in the polymer mixture and
   the coating material is applied as a multilayer coating that comprises:
   i) an outer layer comprising the coating material with from 40 to 60% by weight of the aliphatic-aromatic polyester and from 60 to 40% by weight of the polylactic acid and from 0 to 10% by weight of a wax formulation comprising wax, dispersant and antiblocking agents;
   ii) a middle layer comprising from 50 to 100% by weight of the polylactic acid and from 0 to 50% by weight of the aliphatic-aromatic polyester; and
   iii) an inner layer in contact with the paper, comprising from 50 to 100% of the aliphatic-aromatic polyester and from 0 to 50% of the polylactic acid.

2. The process according to claim 1, wherein the adipic acid derivative, or adipic acid, is present from 52 to 65 mol %, and the terephthalic acid derivative is present from from 48 to 35 mol %, based on the total of components i to ii.

3. The process according to claim 1, wherein the coating material further comprises up to 2% by weight of an epoxide-containing poly(meth)acrylate.

4. The process according to claim 1, wherein the biodegradable, aliphatic-aromatic polyester further comprises:
   v) from 0 to 50% by weight, based on the total weight of the components i to iv, of an organic filler selected from the group consisting of: native starch, plasticized starch, natural fiber, wood meal, and an inorganic filler, wherein said inorganic filler is selected from the group consisting of: chalk, precipitated calcium carbonate, graphite, gypsum, conductive carbon black, iron oxide, calcium chloride, dolomite, kaolin, silicon dioxide, sodium carbonate, titanium dioxide, silicate, wollastonite, mica, montmorillonite, talc, glass fibers and mineral fibers and
   vi) from 0 to 2% by weight, based on the total weight of the components i to iv, of at least one stabilizer, nucleating agent, lubricant and release agent, surfactant, wax, antistatic agent, antifogging agent, dye, pigment, UV absorber, UV stabilizer or other plastics additive.

5. The process according to claim 1, wherein component i) of the biodegradable, aliphatic-aromatic polyester is a mixture of adipic acid with other dicarboxylic acids.

6. The process according to claim 1, the polylactic acid having a melt volume rate (MVR) according to EN ISO 1133 (190° C., 2.16 kg weight) of from 9 to 70 cm$^3$/10 min.

7. The process according to claim 4, wherein the polymer mixture comprises from 0.1 to 1% by weight of nucleating agent(s).

8. The process of claim 1 wherein the applying the coating is used in the production of paper bags for dry foods, liquids, tube laminates, paper carrier bags, paper laminates and coextrudates, paper adhesive tape, cardboard cups, yoghurt pots, meal trays, wound cardboard containers, wet-strength cartons for outer packagings, fruit boxes of coated cardboard, fast food plates, clamp shells, beverage cartons, cartons for liquids, frozen food cartons, ice packaging, paper labels, flower pots and plant pots.

9. The process of claim 4 wherein the inorganic filler is quartz.

10. The process of claim 1 wherein the coating material comprises 70% to 50% by weight of the biodegradable, aliphatic-aromatic polyester, and 30% to 50% by weight of the polylactide.

* * * * *